United States Patent
Dry et al.

(10) Patent No.: US 6,602,321 B2
(45) Date of Patent: *Aug. 5, 2003

(54) DIRECT SMELTING PROCESS

(75) Inventors: Rodney James Dry, City Beach (AU); Robin John Batterham, Parkville (AU)

(73) Assignee: Technological Resources Pty. Ltd., Melbourne (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/873,588

(22) Filed: Jun. 4, 2001

(65) Prior Publication Data

US 2002/0050188 A1 May 2, 2002

Related U.S. Application Data

(63) Continuation-in-part of application No. 09/669,397, filed on Sep. 26, 2000, now Pat. No. 6,428,603.

(51) Int. Cl.⁷ .................................................. C21C 5/30
(52) U.S. Cl. ............................ 75/538; 75/533; 75/548; 75/414
(58) Field of Search .......................... 75/533, 538, 548

(56) References Cited

U.S. PATENT DOCUMENTS

| 2,647,045 | A | 7/1953 | Rummel |
| 3,844,770 | A | 10/1974 | Nixon |
| 3,845,190 | A | 10/1974 | Yosim et al. |
| 3,888,194 | A | 6/1975 | Kishigami et al. |
| 3,890,908 | A | 6/1975 | von Klenck et al. |

(List continued on next page.)

FOREIGN PATENT DOCUMENTS

| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |

(List continued on next page.)

OTHER PUBLICATIONS

U.S. patent application Ser. No. 09/550,421, Dry, filed Apr. 17, 2000.
U.S. patent application Ser. No. 09/160,913, Dry, filed Sep. 25, 1998.
U.S. patent application Ser. No. 09/331,277, Jai, filed Jun. 17, 1999.
U.S. patent application Ser. No. 09/331,272, Bates, filed Jun. 17, 1999.
U.S. patent application Ser. No. 09/509,314, Bates, filed Mar. 21, 2000.
U.S. patent application Ser. No. 09/535,665, Leigh, filed Mar. 21, 2000.

(List continued on next page.)

*Primary Examiner*—Roy King
*Assistant Examiner*—Andrew Wessman
(74) *Attorney, Agent, or Firm*—Merchant & Gould, P.C.

(57) ABSTRACT

A direct smelting process and a fixed, ie non-rotatable, metallurgical vessel for producing metal from a metalliferous feed material is disclosed. The process is a molten bath-based process which includes injecting solid feed materials with a carrier gas into the molten bath via one or more downwardly extending lance/tuyere (11) and causing gas flow from the molten bath at a flow rate of at least 0.30 $Nm^3/s/m^2$ at the interface between the metal layer (15) and the slag layer (16) of the molten bath (under quiescent conditions).

12 Claims, 3 Drawing Sheets

U.S. PATENT DOCUMENTS

| | | | |
|---|---|---|---|
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takeshita et al. |
| 4,504,043 A | 3/1985 | Yamaoka et al. |
| 4,511,396 A | 4/1985 | Nixon |
| 4,565,574 A | 1/1986 | Katayama et al. |
| 4,566,904 A | 1/1986 | von Bogdandy et al. |
| 4,572,482 A | 2/1986 | Bedell |
| 4,574,714 A | 3/1986 | Bach et al. |
| 4,602,574 A | 7/1986 | Bach et al. |
| 4,664,618 A | 5/1987 | Gitman |
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Sugiura et al. |
| 4,798,624 A | 1/1989 | Brotzmann et al. |
| 4,804,408 A | 2/1989 | Puhringer |
| 4,849,015 A | 7/1989 | Fassbinder et al. |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,936,908 A | 6/1990 | Takahashi et al. |
| 4,940,488 A | 7/1990 | Maeda et al. |
| 4,946,498 A | 8/1990 | Weber |
| RE33,464 E | 11/1990 | Gitman |
| 4,976,776 A | 12/1990 | Elvander et al. |
| 4,995,906 A | 2/1991 | Iwasaki et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. |
| 5,065,985 A | 11/1991 | Takahashi et al. |
| 5,078,785 A | 1/1992 | Ibaraki et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,246,482 A | 9/1993 | Murakami et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochie et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Satchell, Jr. |
| 5,630,862 A | 5/1997 | Greenwalt |
| 5,640,708 A | 6/1997 | Conochie et al. |
| 5,647,888 A | 7/1997 | Keogh et al. |
| 5,683,489 A | 11/1997 | Hayashi et al. |
| 5,741,349 A | 4/1998 | Hubble et al. |
| 5,800,592 A | 9/1998 | den Hartog et al. |
| 5,802,097 A | 9/1998 | Gensini et al. |
| 5,869,018 A | 2/1999 | Stephens, Jr. |
| 5,871,560 A | 2/1999 | Fluch et al. |
| 5,938,815 A | 8/1999 | Satchell, Jr. |
| 6,143,054 A | 11/2000 | Dry |

FOREIGN PATENT DOCUMENTS

| | | |
|---|---|---|
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 96/31627 | 10/1996 |
| WO | WO 97/17473 | 5/1997 |
| WO | WO 97/20958 | 6/1997 |
| WO | WO 97/23656 | 7/1997 |
| WO | WO 98/27232 | 6/1998 |
| WO | WO 98/27239 | 6/1998 |
| WO | WO 99/16911 | 4/1999 |

OTHER PUBLICATIONS

U.S. patent application Ser. No. 09/462,282, MacCarthy, filed Mar. 16, 2000.

U.S. patent application Ser. No. 09/478,750, Dry, filed Jan. 6, 2000.

U.S. patent application Ser. No. 09/509,286, MCarthy, filed Mar. 21, 2000.

U.S. patent application Ser. No. 09/509,264, Dry, filed Mar. 21, 2000.

U.S. patent application Ser. No. 09/509,290, Dry, filed Mar. 21, 2000.

U.S. patent application Ser. No. 09/509,323, Dry, filed Mar. 21, 2000.

U.S. patent application Ser. No. 09/587,774, Bates, filed Jun. 6, 2000.

U.S. patent application Ser. No. 09/611,514, Bates, filed Jul. 7, 2000.

U.S. patent application Ser. No. 09/632,730, Dry, filed Aug. 4, 2000.

U.S. patent application Ser. No. 09/634,059, Burke, filed Aug. 9, 2000.

U.S. patent application Ser. No. 09/685,488, Burke, filed Oct. 10, 2000.
U.S. patent application Ser. No. 09/692,821, Dry, filed Oct. 12, 2000.
Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.
WPAT print–out for Brazilian patent application PI9400123–5 (Weber), 1995 No Month.
Patent Abstracts of Japan, C–951, JP, A, 4–63217 (Kawasaki Heavy Ind. Ltd.), Feb. 28, 1992.
Patent abstracts of Japan, C–497, p. 115, JP, A, 62–280315 (Nippon Kokan K.K), Dec. 15, 1987.
Derwent Abstract Accession No. 87–039748/06, JP, A, 61–295334, Dec. 26, 1986.
International Search Report PCT/AU00/00938, 2000 No Month.

BATH DERIVED GASES VS HTE_TS
CAMPAIGN 6-2

DIRECT SMELTING PROCESS

This application is a Continuation-in-Part of Ser. No. 09/669,397, which was filed Sep. 26, 2000, now U.S. Pat. No. 6,428,603.

The present invention relates to a process for producing molten metal (which term includes metal alloys), in particular although by no means exclusively iron, from metalliferous feed material, such as ores, partially reduced ores and metal-containing waste streams, in a metallurgical vessel containing a molten bath.

The present invention relates particularly to a molten metal bath-based direct smelting process for producing molten metal from a metalliferous feed material.

The most widely used process for producing molten iron is based on the use of a blast furnace. Solid material is charged into the top of the furnace and molten iron is tapped from the hearth. The solid material includes iron ore (in sinter, lump or pellet form), coke, and fluxes and forms a permeable burden that moves downwardly. Preheated air, which may be oxygen enriched, is injected into the bottom of the furnace and moves upwardly through the permeable bed and generates carbon monoxide and heat by combustion of coke. The result of these reactions is to produce molten iron and slag.

A process that produces iron by reduction of iron ore below the melting point of the iron produced is generally classified as a "direct reduction process" and the product is referred to as DRI.

The FIOR (Fluid Iron Ore Reduction) process is an example of direct reduction process. The process reduces iron ore fines as the fines are gravity-fed through each reactor in a series of fluid bed reactors. The fines are reduced in solid state by compressed reducing gas that enters the bottom of the lowest reactor in the series and flows counter-current to the downward movement of fines.

Other direct reduction processes include moving shaft furnace-based processes, static shaft furnace-based processes, rotary hearth-based processes, rotary kiln-based processes, and retort-based processes.

The COREX process includes a direct reduction process as one stage. The COREX process produces molten iron directly from coal without the blast furnace requirement of coke. The COREX process includes 2-stage operation in which:

(a) DRI is produced in a shaft furnace from a permeable bed of iron ore (in lump or pellet form) and fluxes; and (b) the DRI is then charged without cooling into a connected melter gasifier and melted.

Partial combustion of coal in the fluidised bed of the melter gasifier produces reducing gas for the shaft furnace.

Another known group of processes for producing iron is based on cyclone converters in which iron ore is melted by combustion of oxygen and reducing gas in an upper melting cyclone and is smelted in a lower smelter containing a bath of molten iron. The lower smelter generates the reducing gas for the upper melting cyclone.

A process that produces molten metal directly from ores (and partially reduced ores) is generally referred to as a "direct smelting process".

One known group of direct smelting processes is based on the use of electric furnaces as the major source of energy for the smelting reactions.

Another known direct smelting process, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen enriched air or oxygen into the slag via a lower row of tuyeres to provide slag agitation and injection of oxygen into the slag via an upper row of tuyeres to promote post-combustion. In the Romelt process the metal layer is not an important reaction medium.

Another known group of direct smelting processes that are slag-based is generally described as "deep slag" processes. These processes, such as DIOS and AISI processes, are based on forming a deep layer of slag. As with the Romelt process, the metal layer below the slag layer is not an important reaction medium.

Another known direct smelting process which relies on a molten metal layer as a reaction medium, and is generally referred to as the HIsmelt process, is described in International application PCT/AU96/00197 (WO 96/31627) in the name of the applicant.

The HIsmelt process as described in the International application comprises:

(a) forming a molten bath having a metal layer and a slag layer on the metal layer in a vessel;

(b) injecting into the bath:
  (i) a metalliferous feed material, typically metal oxides; and
  (ii) a solid carbonaceous material, typically coal, which acts as a reductant of the metal oxides and a source of energy; and (c) smelting the metalliferous feed material to metal in the metal layer.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there are ascending and thereafter descending droplets or splashes or streams of molten metal and slag which provide an effective medium to transfer to the bath the thermal energy generated by post-combusting reaction gases above the bath.

A preferred form of the HIsmelt process is characterized by forming the transition zone by injecting carrier gas, metalliferous feed material, solid carbonaceous material and optionally fluxes into the bath through lances that extend downwardly and inwardly through side walls of the vessel so that the carrier gas and the solid material penetrate the metal layer and cause molten material to be projected from the bath.

This form of the HIsmelt process is an improvement over earlier forms of the process which form the transition zone by bottom injection of carrier gas and solid carbonaceous material through tuyeres into the bath which causes droplets, splashes and streams of molten material to be projected from the bath.

The applicant has carried out extensive pilot plant work on the above-described preferred form of the HIsmelt process and has made a series of significant findings in relation to the process.

According to the present invention there is provided a direct smelting process for producing metal from an iron-containing metalliferous feed material in a metallurgical vessel, which process includes the steps of:

(a) forming a molten bath containing molten metal and slag in the vessel;

(b) supplying an iron-containing metalliferous feed material and a solid carbonaceous material to the vessel and smelting metalliferous material to metal in the molten bath, the solids supplying step including injecting at least part of the solid carbonaceous material and a carrier gas into the molten bath via one or more than one downwardly extending lance/tuyere which extends below the location of the nominal surface of the molten bath (as determined under quiescent conditions), whereby the solids and gas injection causes gas flow ("bath-derived gas flow") in and from the molten bath, which gas flow promotes substantial mixing of molten material in the molten bath, which gas flow has a flow rate of at least 0.30 $Nm^3/s/m^2$ at the location of the nominal surface of the molten bath (as determined under quiescent conditions), which gas flow entrains molten material in the molten bath and carries the molten material upwardly from the bath as splashes, droplets and streams, whereby at least part of the splashes, droplets and streams of molten material contact the side walls of the vessel and form a protective layer of slag; and (c) injecting an oxygen-containing gas into the vessel via one or more than one lance/tuyere and post-combusting reaction gases released from the molten bath, whereby ascending and thereafter descending splashes, droplets and streams of molten material facilitate heat transfer to the molten bath.

The above-described process is one in which there is strong agitation of molten material in the molten bath which results in a thoroughly mixed bath.

The process requires that the injection of solids and gas into the molten bath causes a bath-derived gas flow rate of at least 0.30 $Nm^3/s/m^2$ from the surface of the bath. This flow rate ensures that there is sufficient buoyancy uplift of splashes, droplets and streams of molten material from the molten bath to maximise:

(a) heat transfer to the molten bath via subsequently descending splashes, droplets and streams of molten material; and (b) contact of molten material with the side walls of the vessel which forms a protective layer of slag that reduces heat loss from the vessel.

Item (b) above is a particularly important consideration in the context of the preferred vessel construction of the present invention which includes water cooled panels that form the side walls in the upper barrel section and optionally the roof and water-cooled refractory bricks that form the side walls in the lower barrel section of the vessel.

The flow rate of at least 0.30 $Nm^3/s/m^2$ from the surface of the bath is a substantially higher bath-derived gas flow rate than the Romelt process and the deep-slag process such as the DIOS and AISI processes described above and is a significant difference between the process of the present invention and these known direct smelting processes.

By way of particular comparison, U.S. Pat. No. 5,078,785 of Ibaraki et al (assigned to Nippon Steel Corporation) discloses a particular form of a deep-slag process using a rotatable vessel and discloses bottom injection of gas into a metal layer for the purpose of metal bath agitation. The paragraph commencing at line 17 of column 14 discloses that it is preferred that the "metal bath agitation force" generated by the bottom gas injection be no more than 6 kW/t. The U.S. patent discloses that at higher levels of agitation there may be undesirably high levels of iron dust generation. On the basis of the information provided in the paragraph commencing at line 21 of column 14, a maximum metal bath agitation force of 6 kW/t corresponds to a maximum bath-derived gas flow rate of 0.12 $Nm^3/s/m^2$ at the interface between the metal layer and the slag layer. This maximum gas flow rate is considerably below the minimum flow rate of 0.30 $Nm^3/s/m^2$ of the present invention.

Preferably the process includes the addition of solid carbonaceous material into the molten bath in an amount selected to maintain a concentration of at least 3 wt % dissolved carbon in metal in the bath. This results in the molten bath being in a strongly reducing condition.

Preferably the bath is in a strongly reducing condition so that the concentration of FeO in slag is less than 8 wt % based on the weight of slag.

Preferably, the process also includes the addition of solid carbonaceous material into the molten bath in an amount selected to be greater than that required for smelting the metalliferous feed material and generating heat to maintain reaction rates so that dust entrained in off-gas leaving the vessel contains at least some excess carbon with the result that there is at least 4 wt % carbon in dust based on the weight of dust.

Preferably the process includes smelting metalliferous material to metal mainly in the metal layer.

Preferably the solids and gas injection in step (b) causes gas flow from the molten bath substantially across the molten bath.

Preferably the gas flow rate is at least 0.35 $Nm^3/s/m^2$, more preferably at least 0.50 $Nm^3/s/m^2$, from the surface of the molten bath.

Preferably the gas flow rate is less than 0.90 $Nm^3/s/m^2$ from the surface of the molten bath.

Typically, slag is a major part and molten metal is the remaining part of the molten material in the splashes, droplets and streams of molten material.

The term "smelting" is understood herein to mean thermal processing wherein chemical reactions that reduce metal oxides take place to produce liquid metal.

It is preferred that the concentration of solid carbon in dust in off-gas from the vessel be in the range of 5 to 90 wt % (more preferably 20 to 50 wt %) of the weight of dust in the off-gas at a rate of dust generation of 10–50 $g/Nm^3$ in the off-gas.

Preferably solids supplying step (b) includes injecting at least part of the metalliferous material and the carbonaceous material and the carrier gas into the molten bath via one or more lance/tuyere.

The injection of metalliferous material and carbonaceous material may be through the same lance/tuyere or separate lances/tuyeres.

Preferably step (c) of the process post-combusts reaction gases, such as carbon monoxide and hydrogen, generated in the molten bath, in a top space above the surface of the molten bath and transfers the heat generated by the post-combustion to the molten bath to maintain the temperature of the molten bath—as is essential in view of endothermic reactions in the molten bath.

Preferably the one or more than one oxygen-containing gas injection lance/tuyere is positioned to inject the oxygen-containing gas into a central region of the vessel.

The oxygen-containing gas may be oxygen, air or oxygen enriched air containing up to 40% oxygen by volume.

Preferably the oxygen-containing gas is air.

More preferably the air is pre-heated.

Typically, the air is preheated to 1200° C.

The air may be oxygen enriched.

Preferably step (c) of the process operates at high levels, ie at least 40%, of post-combustion, where post-combustion is defined as:

$$\frac{[CO_2] + [H_2O]}{[CO_2] + [H_2O] + [CO] + [H_2]}$$

where:
  [$CO_2$]=volume % of $CO_2$ in off-gas;
  [$H_2O$]=volume % of $H_2O$ in off-gas;
  [CO]=volume % of CO in off-gas; and
  [$H_2$]=volume % of $H_2$ in off-gas.

Preferably the process operates at 50% or more post-combustion.

It is preferred particularly that the process operates at 60% or more post-combustion.

In some instances a supplementary source of solid or gaseous carbonaceous material (such as coal or natural gas) may be injected into the off-gas from the vessel in order to capture thermal energy in the form of chemical energy.

An example of such supplementary injection of carbonaceous material is injection of natural gas which cracks and reforms, and thus cools, the off-gas whilst enriching its fuel value.

The supplementary carbonaceous material may be added in the upper reaches of the vessel or in the off-gas duct after the off-gas has left the vessel.

Preferably, the one or more than one lance/tuyere extend through the side walls of the vessel and are angled downwardly and inwardly towards the metal layer.

The upward movement of splashes, droplets and streams of molten material from the molten bath forms a molten material-containing zone above the bath. This zone is hereinafter referred to as a "transition zone".

Preferably the location and operating parameters of the one or more than one lance/tuyere that injects the oxygen-containing gas and the operating parameters that control the transition zone are selected so that:

(a) the oxygen-containing gas is injected towards and penetrates the transition zone;
(b) the transition zone extends upwardly around the lower section of the or each lance/tuyere and thereby shields to some degree the side walls of the vessel from the combustion zone generated at the end of the or each lance/tuyere; and
(c) there is gas continuous space described as a "free space" which contains practically no metal and slag around the end of the or each lance/tuyere.

Item (c) above is an important feature because it makes it possible for reaction gases in the top space of the vessel to be drawn into the region at the end of the or each lance/tuyere and be post-combusted in the region.

Preferably the process maintains a relatively high (but not too high) slag inventory and uses the amount of slag as a means of controlling the process.

The term "relatively high slag inventory" may be understood in the context of the amount of slag compared to the amount of metal in the vessel.

Preferably, when the process is operating under stable conditions, the weight ratio of metal:slag is between 4:1 and 1:2.

More preferably the weight ratio of metal:slag is between 3:1 and 1:1.

It is preferred particularly that the metal:slag weight ratio be between 2:1 and 1:1.

The term relatively high slag inventory may also be understood in the context of the depth of slag in the vessel.

The amount of slag in the molten bath has a direct impact on the amount of slag that is in the slag-rich transition zone.

The slag is important in the context of minimising heat loss via radiation from the transition zone to the side walls of the vessel.

If the slag inventory is too low there will be increased exposure of metal in the transition zone and therefore increased oxidation of metal and the potential for reduced post-combustion.

If the slag inventory is too high then the one or more than one oxygen-containing gas injection lance/tuyere become buried in the transition zone and this minimises movement of top space reaction gases to the end of the or each lance/tuyere and, as a consequence, reduces potential for post-combustion.

The metalliferous feed material may be any suitable iron containing material. The iron-containing material may be in the form of ores, partially reduced ores, DRI (direct reduced iron), iron carbide, millscale, blast furnace dust, sinter fines, BOF dust or a mixture of such materials.

In the case of partially reduced ores, the degree of pre-reduction may range from relatively low levels (eg to FeO) to relatively high levels (eg 70 to 95% metallisation).

In this connection, the process further includes partially reducing metalliferous ores and thereafter injecting the partially reduced ores into the molten bath.

The metalliferous feed material may be pre-heated.

The carrier gas may be any suitable carrier gas.

It is preferred that the carrier gas be an oxygen-deficient gas.

It is preferred that the carrier gas comprise nitrogen.

The present invention is described further by way of example with reference to the accompanying drawings of which:

The following description is in the context of smelting iron ore to produce molten iron and it is understood that the present invention is not limited to this application and is applicable to any suitable metallic ores and/or concentrates—including partially reduced metallic ores and waste revert materials.

Figure 1:
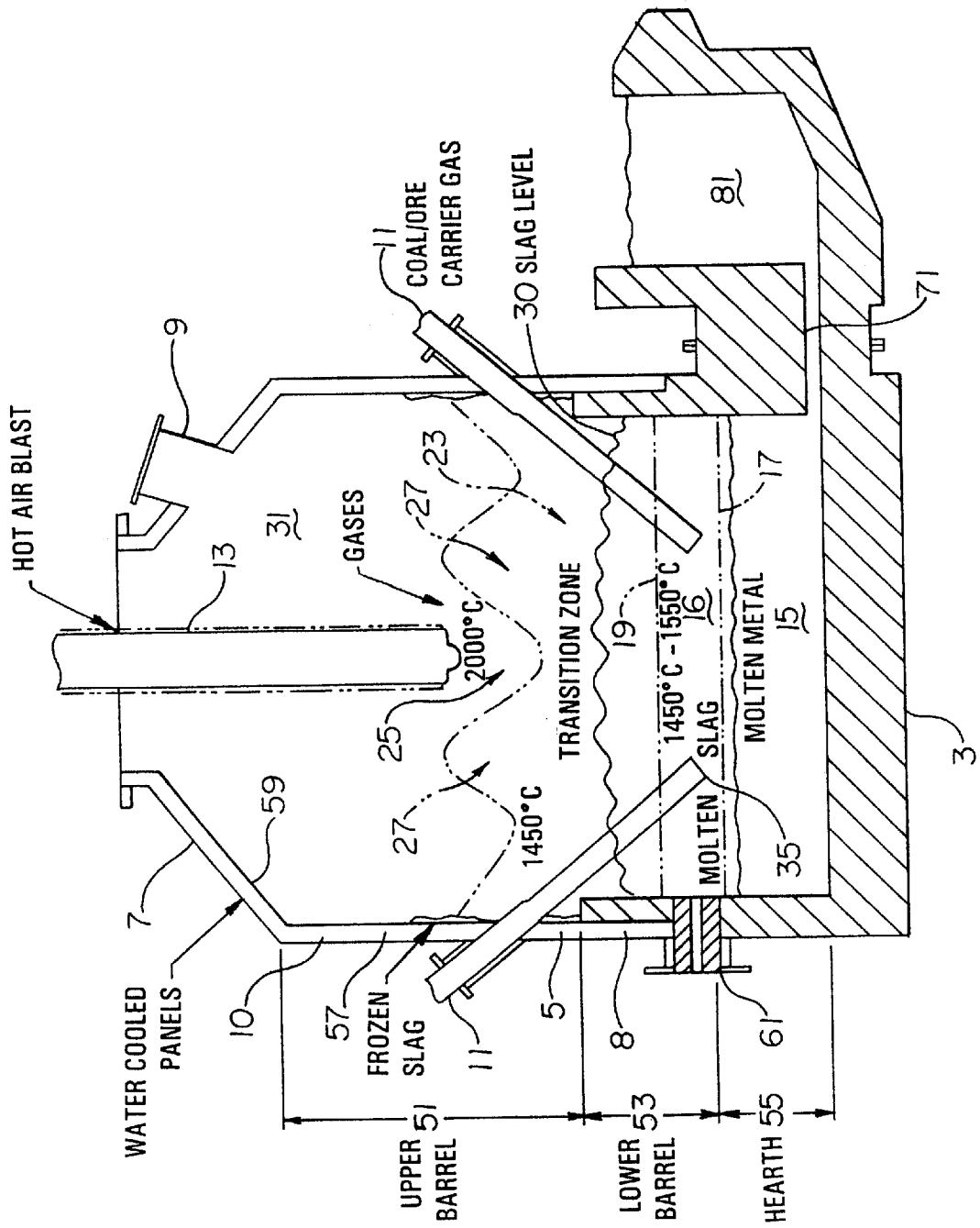
FIG. 1 is a vertical section through a metallurgical vessel illustrating in schematic form a preferred embodiment of the process of the present invention.

The vessel shown in FIG. 1 is a fixed, ie non-rotatable, vessel that has a cylindrical hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 81 which can discharge molten iron continuously; a forehearth connection 71 that interconnects the hearth and the forehearth 81; and a tap-hole 61 for discharging molten slag.

In use, the vessel contains a molten bath of iron and slag. Under quiescent conditions, the bath includes a layer 15 of molten iron and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The surface 19 is also the quiescent surface of the molten bath. The term "quiescent surface" is understood to mean the surface when there is no injection of gas and solids into the vessel.

The vessel also includes 2 solids injection lances/tuyeres 11 extending downwardly and inwardly at an angle of 30–60° to the vertical through the side walls 5 and into the molten bath. The position of the lances/tuyeres 11 is selected so that the lower ends are above the quiescent surface 17 of the iron layer 15.

In use, iron ore, solid carbonaceous material (typically coal), and fluxes (typically lime and magnesia) entrained in a carrier gas (typically $N_2$) are injected into the molten bath via the lances/tuyeres 11. The coal is devolatilised and thereby produces gas in the molten bath. Carbon partially dissolves into the metal and partially remains as solid carbon. The iron ore is smelted to metal and the smelting reaction generates carbon monoxide gas. The gases transported into the molten bath and generated via devolatilisation and smelting produce significant buoyancy uplift of molten metal, solid carbon, and slag which generates an upward movement of splashes, droplets and streams of molten material and solid carbon from the molten bath.

The applicant has found in the pilot plant work that generating gas flow in the molten bath that generates gas flow from the molten bath at a rate of at least 0.30 $Nm^3/s/m^2$ of the area of the molten bath at the quiescent bath surface 19, preferably substantially across the area, causes substantial agitation in the molten bath, with the result that:

(a) the molten bath expands in volume and has a surface indicated by the arrow 30; and (b) there is thorough mixing of molten material in the molten bath such that there are reasonably uniform temperatures throughout the molten bath, typically, 1450–1550° C.

In addition, the applicant has found in the pilot plant work that the above-described gas flow rate and resultant buoyancy uplift of molten material and solid carbon from the molten bath:

(a) forms a transition zone 23; and (b) projects some molten material (predominantly slag) beyond the transition zone and onto the part of the upper barrel section 51 of the side walls 5 that is above the transition zone 23 and onto the roof 7.

In general terms, the transition zone 23 is a gas continuous volume with splashes, droplets, and streams of molten material.

The vessel further includes a lance 13 for injecting an oxygen-containing gas (typically pre-heated oxygen enriched air) which is centrally located and extends vertically downwardly into the vessel. The position of the lance 13 and the gas flow rate through the lance 13 are selected so that under steady-state process conditions the oxygen-containing gas penetrates the central region of the transition zone 23 and maintains an essentially metal/slag free space 25 around the end of the lance 13.

In use, the injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes droplets, and streams, of molten material in the region of gas injection and the heat is then partially transferred to the molten bath.

The free space 25 is important to achieving high levels of post combustion, ie more than 40%, because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten material is to shape the transition zone 23 around the lower region of the lance 13—generally identified by the numerals 27. This shaped region provides a partial barrier to heat transfer by radiation to the side walls 5.

Moreover, the ascending and descending droplets, splashes and streams of molten material is an effective means of transferring heat from the transition zone 23 to the molten bath with the result that the temperature of the transition zone 23 in the region of the side walls 5 is of the order of 1450° C.–1550° C.

The process includes selecting the amount of the solid carbonaceous material added to the bath to be greater than that required for smelting the iron ore introduced to the bath so that solid carbon in the form of soot or char is carried through the bath and the transition zone 23. As a result, carbon is present in significant quantity in dust in the off-gas from the vessel. Carbon may also be present in small amounts in slag which is tapped from the vessel.

The solid carbonaceous material injected into the molten bath is sufficient to maintain:

(a) a concentration of at least 3 wt % carbon in metal in the bath;

(b) FeO levels below 8 wt % in a substantial part of the molten bath;

(c) At least 4% carbon in dust entrained in the off-gas from the vessel.

The advantages of operating the method of the present invention with excess carbon are two fold.

Firstly, high levels of dissolved carbon in metal in the bath and strong mixing of metal in the molten bath ensures that the molten bath is maintained in a strongly reduced condition by virtue of metal-slag mixing. A bath with a low FeO content thus obtained avoids operational problems associated with uncontrolled, potentially rapid reaction between high FeO slag and carbon-rich metal.

Secondly, the bath is maintained close to saturation with respect to dissolved carbon and the carbon content of metal does not need to be controlled explicitly. Loss of carbon from metal is a serious issue from a plant operation's view point since the liquidus of the metal (for the iron-carbon system) changes significantly on either side of the eutectic. The presence of excess carbon in the bath means that the system is self-correcting to a degree, with more time for corrective action available to the operator in the even of a process disturbance.

The degree of post-combustion achieved in the vessel is effectively controlled by the amount of excess carbon being carried from the vessel as dust in the off-gas. This results in unused carbon being carried from the vessel which may be recycled to the vessel. In addition, the amount of carbon in off-gas has been found by the applicant to be a useful measure of the performance of the process.

The vessel is constructed with reference to the levels of the molten bath, and the transition zone 23 in the vessel when the process is operating under steady-state process conditions and with reference to splashes, droplets and streams of molten material that are projected into the top space 31 above the transition zone 23 when the process is operating under steady-state operating conditions, so that:

(a) the hearth and the lower barrel section 53 of the side walls 5 that contact the molten bath are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 57, 59.

Each of the water cooled panels 8, 57, 59 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent straight sections of each pipe and between the pipes.

The water inlets and the water outlets of the pipes are connected to a water supply circuit (not shown) which circulates water at high flow rate through the pipes.

The pilot plant work referred to above was carried out as a series of extended campaigns by the applicant at its pilot plant at Kwinana, Western Australia.

The pilot plant work was carried out with the vessel shown in FIG. 1 and described above and in accordance with the process conditions described above. In particular, the process operated with continuous discharge of molten iron via the forehearth 81 and periodic tapping of molten slag via the tap-hole 61. In the context of the present invention it is relevant to note that the hearth diameter was 2.74 m.

The pilot plant work evaluated the vessel and investigated the process under a wide range of different:

(a) feed materials;

(b) solids and gas injection rates;

(c) slag inventories—measured in terms of the depth of the slag layer and the slag:metal ratios;

(d) operating temperatures; and (e) apparatus set-ups.

Figure 2:
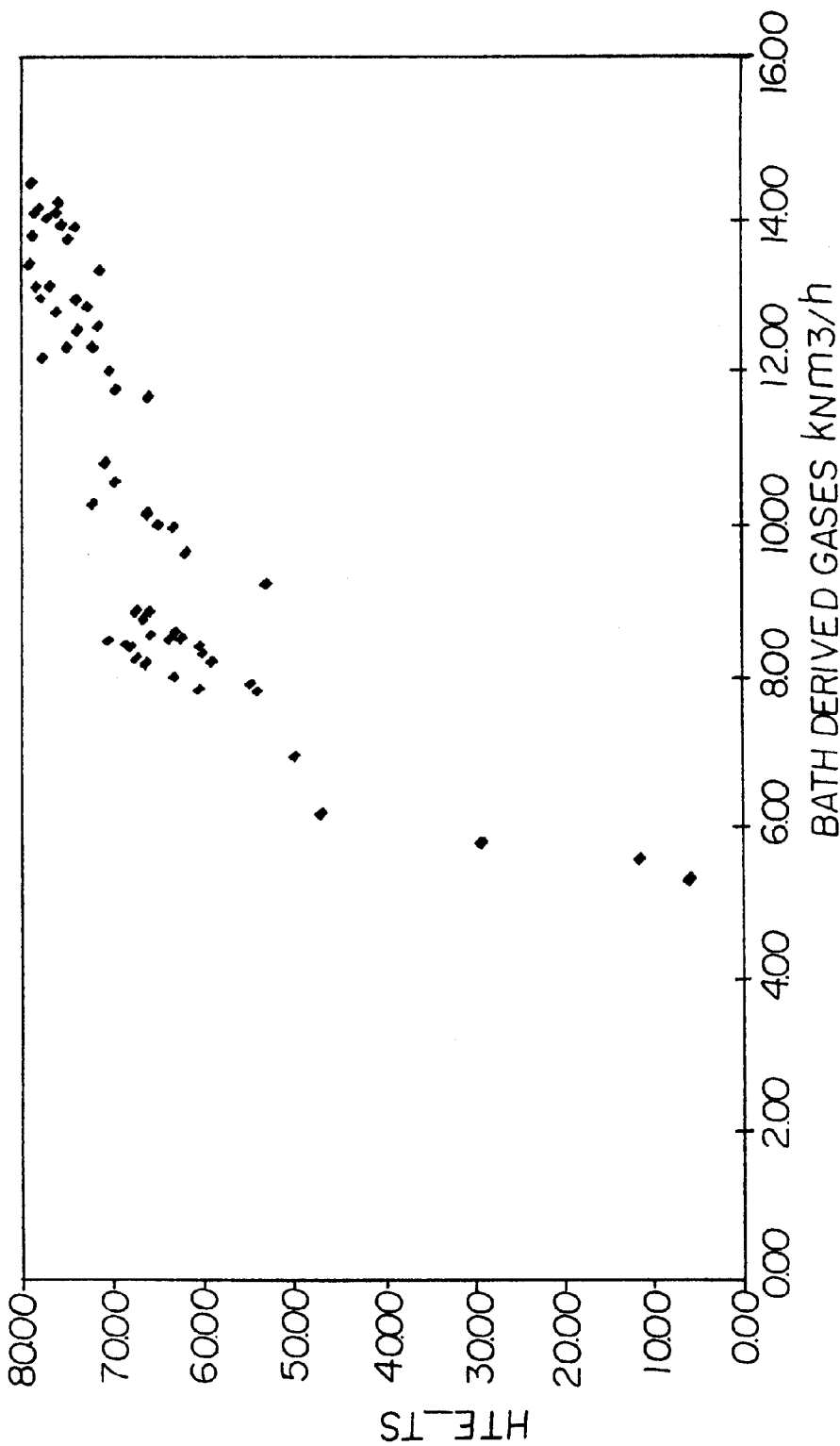
FIG. 2 is a graph of heat transfer efficiency vs flow rate of bath derived gases for campaign 8.1 of the pilot plant work carried out by the applicant.
Figure 3:
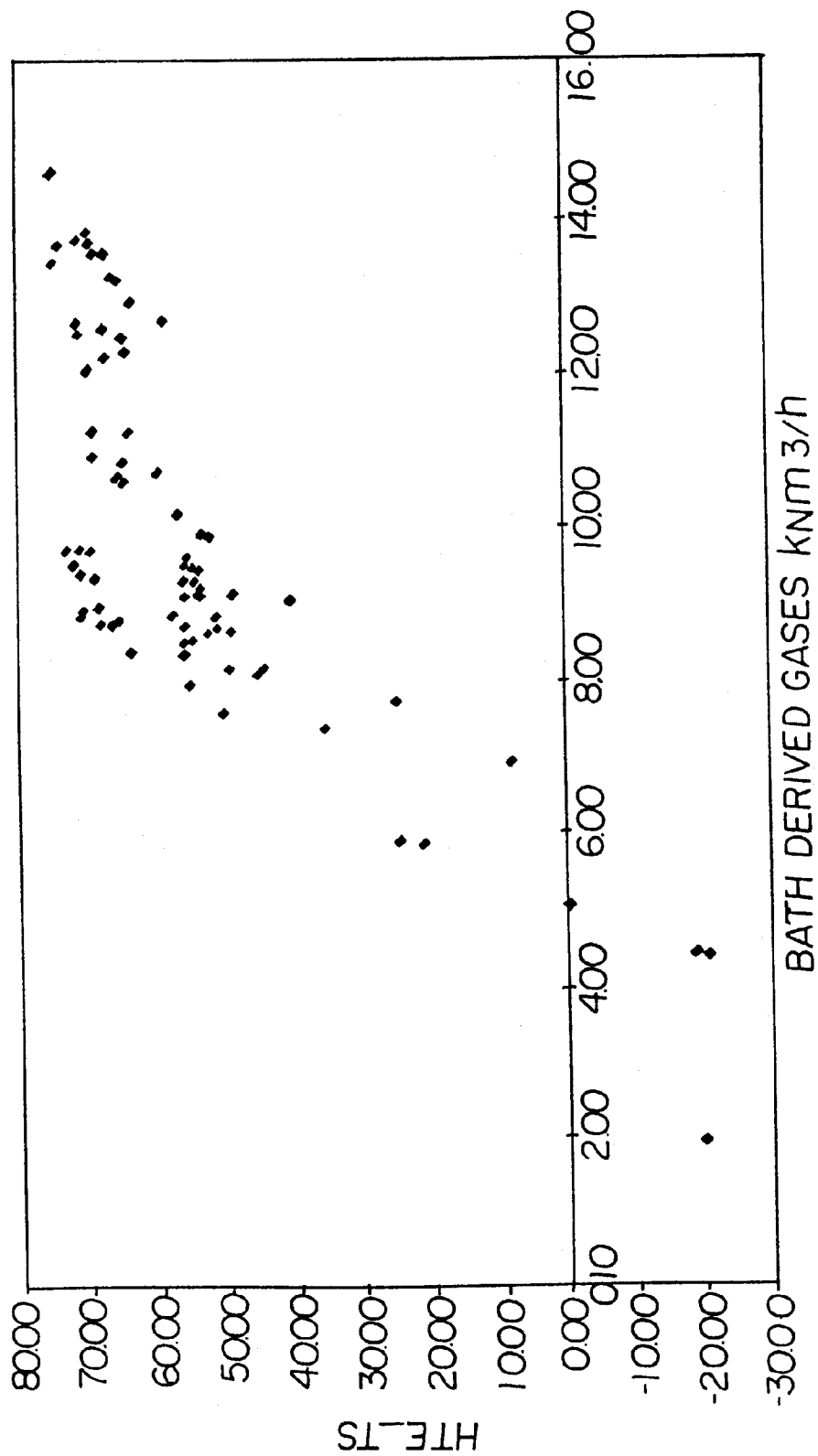
FIG. 3 is a graph of heat transfer efficiency vs flow rate of bath derived gases for campaign 8.2 of the pilot plant.

FIGS. 2 and 3 are graphs which plot the relationship between heat transfer efficiency (HTE-TS) and the flow rate of bath derived gases (expressed as kNm$^3$/h) for two of the pilot plant campaigns.

The heat transfer efficiency is the amount of energy generated by post combustion that is transferred to the molten bath divided by the total amount of energy generated by post combustion, expressed as a percentage. If the off-gas is substantially at bath temperature, it is fair to say that high heat transfer efficiencies are an indication of low heat loss from the vessel (which occurs principally via the side walls).

It is evident from FIGS. 2 and 3 that there were sharp increases in heat transfer efficiency at bath-derived gas flow rates of approximately 7.5 kNm$^3$/h. This amount corresponds to 0.32 Nm$^3$/s/m$^2$ at the surface of the molten bath as determined under quiescent conditions.

Many modifications may be made to the preferred embodiment of the present invention described without departing from the spirit and scope theory.

Whilst the preferred embodiment of the present invention generates bath-derived gas flow from the metal layer due to solid material/carrier gas injection through the lances/tuyeres 11, the present invention extends to arrangements in which there is a minor contribution to bath-derived gas flow by bottom/side injection of gas.

Furthermore, whilst the preferred embodiment describes the injection of all of the metalliferous feed material and solid carbonaceous material via lances/tuyeres 11, the present invention extends to arrangements in which there is partial supply of carbonaceous material and total supply of metalliferous feed material via gravity top feeding through the roof of the vessel.

What is claimed is:

1. A direct smelting process for producing metal from an iron-containing metalliferous feed material in a metallurgical vessel, which process includes the steps of:

(a) forming a molten bath containing molten metal and slag in the vessel;

(b) supplying solids including an iron-containing metalliferous feed material and a solid carbonaceous material to the vessel and smelting metalliferous material to metal in the molten bath, the solids supplying step including injecting at least part of the solid carbonaceous material and a carrier gas into the molten bath via one or more than one downwardly extending lance/tuyere which extends below the location of the nominal surface of the molten bath as determined under quiescent conditions, whereby the solids and gas injection causes bath-derived gas flow in and from the molten bath, which bath-derived gas flow promotes substantial mixing of molten material in the molten bath, which bath-derived gas flow has a flow rate of at least 0.30 Nm$^3$/s/m$^2$ at the location of the nominal surface of the molten bath as determined under quiescent conditions, which bath-derived gas flow entrains molten material in the molten bat and carries the molten material upwardly from the bat as splashes, droplets and streams, whereby at least part of the splashes, droplets and streams of molten material contact the side walls of the vessel and form a protective layer of slag; and (c) injecting an oxygen-containing gas into the vessel via one or more than one lance/tuyere and post-combusting reaction gases in the bath derived gas flow released from the molten bath, whereby ascending and thereafter descending splashes, droplets and streams of molten material facilitate heat transfer to the molten bath.

2. The process defined in claim 1 wherein the bath-derived gas flow rate is at least 0.35 Nm$^3$/s/m$^2$.

3. The process defined in claim 1 wherein the bath-derived gas flow rate is less than 0.50 Nm$^3$/s/m$^2$.

4. The process defined in claim 1 wherein step (b) includes supplying an amount of the solid carbonaceous material to the vessel that is sufficient to maintain a concentration of at least 3 wt % dissolved carbon in metal in the molten bath based on the total weight of carbon and metal.

5. The process defined in claim 4 wherein the concentration of dissolved carbon in metal is greater than 4 wt %.

6. The process defined in claim 1 or claim 4 includes releasing an off-gas from the vessel and wherein step (b) includes supplying an amount of the solid carbonaceous material to the vessel that is sufficient to maintain at least 4 wt % carbon in dust, based on the weight of dust, entrained in off-gas leaving the vessel.

7. The process defined in claim 6 wherein the amount of the solid carbonaceous material is sufficient to maintain 5 to 90 wt % carbon in dust, based on the weight of dust in the off-gas, at a rate of dust generation of 10–50 g/Nm$^3$ in the off-gas.

8. The process defined in claim 7 wherein the amount of carbon in dust is 20 to 90 wt %.

9. The process defined in claim 1 includes maintaining a concentration of FeO in the molten bath below 8 wt %.

10. The process defined in claim 1 wherein step (b) includes injecting at least part of the metalliferous material and at least part of the carbonaceous material and the carrier gas into the molten bath via the one or more than one lance/tuyere.

11. The process defined in claim 1 wherein the oxygen-containing gas is selected from the group consisting of oxygen, air and oxygen enriched air containing up to 40% oxygen by volume.

12. The process defined in claim 1 wherein step (c) operates at post combustion levels of at least 40%, where post-combustion is defined as:

$$\frac{[CO_2] + [H_2O]}{[CO_2] + [H_2O] + [CO] + [H_2]}$$

where:
- $[CO_2]$=volume % of $CO_2$ in off-gas;
- $[H_2O]$=volume % of $H_2O$ in off-gas;
- $[CO]$=volume % of CO in off-gas; and
- $[H_2]$=volume % of $H_2$ in off-gas.

* * * * *